United States Patent Office 3,301,372
Patented Jan. 31, 1967

3,301,372
BALE DEFLECTING DEVICE
Harvey R. Malmgren, St. Boniface, Manitoba, Canada, assignor, by mesne assignments, to Alco Equipment Ltd., Winnipeg, Manitoba, Canada
Filed Aug. 17, 1964, Ser. No. 390,039
2 Claims. (Cl. 198—7)

My invention relates to new and useful improvements in means for transferring vertically travelling bales to a horizontal conveyor situated at the upper end of a vertically situated conveyor.

Normal vertically extending conveyor usually comprises one or more conveyor chains having bale engaging hooks extending therefrom which engage one side of the bale and elevates same upwardly, the table being restricted from outward movement by means of a vertically situated member spaced and parallel from said conveyor chain run.

As the bale approaches the upper end of such vertical conveyors, and is freed from restraint of the spaced and parallel member, the pull of the conveyor chain tends to tip the bale whereas it is desired to tip the bale inwardly towards a horizontal conveyor, the end of which is adjacent the upper end of the vertical conveyor.

Such vertical conveyors are normally situated externally of the hay storage building with the horizontal conveyor being situated within the building and although stationary deflectors have been utilized, it has ben found that the best results occur with a movable transfer device which flips the bale inwardly towards the horizontal conveyor as it clears the upper end of the vertical conveyor.

I have provided such a device which is spring loaded and normally extends diagonally across the upper end of the vertical conveyor towards the horizontal conveyor. As the vertically travelling bale strikes the inclined deflector, the deflector is forced into the vertical position against spring pressure so that when the bale has been elevated sufficient for the majority of the bale to clear the vertically elevating chain, the spring loaded deflector flips the bale to a horizontal position upon the horizontal conveyor.

The principal object and essence of my invention is therefore to provide a device of the character herewithin described which automatically flips a bale travelling vertically to a horizontal position upon an adjacently situated horizontal conveyor.

Another object of the invention is to provide a device for the character herewithin described which is easily fitted to existing vertically situated conveyors.

Another object of the invention is to provide a device of the character herewithin described which returns to the diagonally extending position as soon as the bale has been flipped, ready to receive the next succeeding bale travelling vertically up the conveyor.

Still another object of the invention is to provide a device of the character herewithin described which eliminates any jamming of blades occurring at the junction between vertically situated conveyor and horizontally situated conveyors.

A still further object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
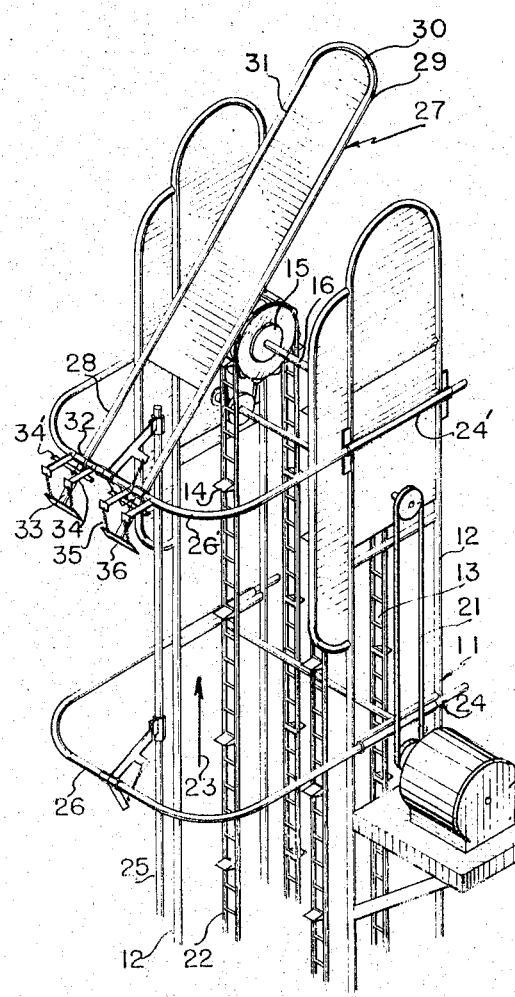
FIGURE 1 is an enlarged fragmentary perspective view of the upper end of a vertical conveyor showing my device in situ.
Figure 2:
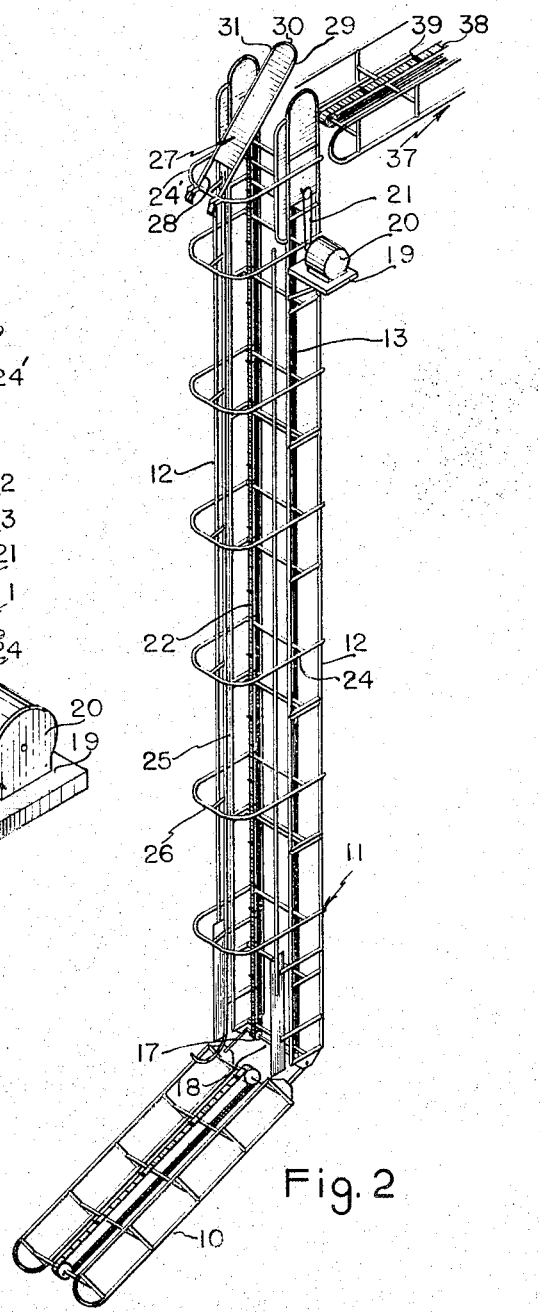
FIGURE 2 is a perspective view reduced in scale from FIGURE 1 and showing the device in the environment between a vertical conveyor and a horizontal conveyor.

Proceeding therefore to describe my invention in detail, reference character 10 illustrates a feed in conveyor situated at ground level upon which bales may be placed for transfer to a vertically situated conveyor collectively designated 11.

This conveyor, which is normally situated against the side of a building (not illustrated) consists of a pair of spaced and parallel vertically situated frames 12 within which is situated a pair of spaced and parallel travelling conveyor chain assemblies 13 having bale engaging hooks 14 extending therefrom. These conveyor chains extend over upper sprockets 15 mounted upon cross shaft 16 and around lower sprockets 17 mounted upon cross shaft 18. An offstanding platform 19 supports a source of power in the form of an electric motor 20 by which drive is transmitted via belt 21 to the aforementioned upper cross shaft 16 thus moving the forward run 22 of the conveyor chain in the direction of arrow 23.

A plurality of horizontally situated conveyor encircling elements 24 extend between the side frames 12 thus defining a bale retaining enclosure and a spring biased pressure rod 25 is mounted upon the transverse portions 26 of these elements, said rod pressing the vertically travelling bales towards the conveyor chain runs 22.

The uppermost element 24' acts as a support for my bale deflector collectively designated 27, the transverse portion 26' thereof supporting for pivotal attachment, a pair of spaced and parallel arms 28 joined at the outer ends 29 thereof by a semi-circular portion 30. The majority of the area between the arms 28 is covered by a plate 31. The bale deflector 27 is mounted pivotally upon the transverse portion 26 by means of bearings 32 spaced from the inner ends 33 of the arms 28.

A plurality of spring anchors 34 are secured to the transverse portion 26' and extend substantially horizontally outwardly therefrom and tension springs 35 extend between these anchors and small cross bars 36 secured to the said inner ends 33 of the arms 28 as clearly illustrated. These tension springs normally bias the deflector 27 diagonally across the vertical conveyor in the direction of the associated horizontal conveyor collectively designated 37 as clearly shown in the drawings.

The angle of inclination of the deflector 27 is governed by transverse stop 34' secured to the portion 33 of the arms 28, said stop 34' engaging the spring anchors 34.

The horizontal conveyor 37 is conventional in construction and includes the conveyor chains 38 having bale engaging hooks 39 extending therefrom and it will be noted that the aforementioned member 24' is substantially in alignment with the horizontal conveyor 37.

As bales are elevated upon the run 22 of the vertical conveyor chain, the end of the bale strikes the deflector 27 forcing it into the vertical position against tension of springs 35 until the bale is nearly clear of the run 22 whereupon the springs 35 cause the deflector 27 to flip the bale endwise into a horizontal position upon the horizontal conveyor 27. As soon as the bale has been flipped, the deflector takes up the position shown in the drawings ready to receive the next suceeding bale travelling upwardly upon the vertical conveyor 11.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A bale transfer device comprising in combination a substantially vertical conveyor and a substantially horizontal conveyor situated at the upper end of said vertical conveyor and extending at right angles therefrom, supporting structure for said vertical and horizontal conveyors, a bale transfer device on said upper end of said vertical conveyor for flipping bales elevated vertically upwards on said vertical conveyor to a horizontal position on said horizontal conveyor, said transfer device comprising a deflector element engageable by said bales travelling vertically on said vertical conveyor, said deflector element being pivotally mounted adjacent one end thereof to said supporting structure adjacent the upper end of said vertical conveyor, and spring means reacting between said one end and said supporting structure normally biasing said element diagonally towards said horizontal conveyor.

2. The device according to claim 1 in which said supporting structure includes a substantially horizontally situated vertical conveyor embracing member situated at the upper end of said vertical conveyor and substantially in alignment with said horizontal conveyor, said bale deflector element being pivotally secured to said member adjacent one end of said deflector element, offstanding spring anchors secured to said supporting member and tension spring extending between said one end and said anchors.

References Cited by the Examiner
UNITED STATES PATENTS

| | | | |
|---|---|---|---|
| 688,684 | 12/1901 | Piez | 198—228 |
| 1,354,975 | 10/1920 | Hurst | 198—228 |
| 2,741,512 | 4/1956 | Stott | 198—228 |
| 2,785,810 | 3/1957 | Kneib. | |
| 3,182,782 | 5/1965 | Beiler | 198—7 |
| 3,182,783 | 5/1965 | Smoker | 198—7 |

EVON C. BLUNK, *Primary Examiner.*

RICHARD E. AEGERTER, *Examiner.*